United States Patent [19]

Sills

[11] 4,456,056
[45] Jun. 26, 1984

[54] MODIFIED ANNUAL CYCLE ENERGY SYSTEM

[76] Inventor: Terrence J. Sills, 207 S. Castle Dr., Dunlap, Ill. 61525

[21] Appl. No.: 418,811

[22] Filed: Sep. 16, 1982

[51] Int. Cl.³ .............................................. F28D 21/00
[52] U.S. Cl. .......................................... 165/45; 62/260; 62/238.7; 165/96; 165/104.11; 165/104.27
[58] Field of Search .................. 62/260, 238.7; 165/45, 165/96, 104.11, 104.27

[56] References Cited

U.S. PATENT DOCUMENTS

| | | | |
|---|---|---|---|
| 4,224,805 | 9/1980 | Rothwell | 165/45 |
| 4,279,294 | 7/1981 | Fitzpatrick et al. | 165/45 |
| 4,346,569 | 8/1982 | Yuan | 165/104.11 |
| 4,375,831 | 3/1983 | Downing | 62/238.7 |

FOREIGN PATENT DOCUMENTS 56-12991  2/1981  Japan ..................................... 165/45

*Primary Examiner*—Albert W. Davis, Jr.
*Attorney, Agent, or Firm*—James R. Bell

[57] ABSTRACT

The Annual Cycle Energy System (ACES) is a system that provides domestic hot water heating, space heating and space cooling for buildings. This system uses a unidirectional heat pump and a large water/ice storage tank to make ice during the heating season that is used to cool the building during the summer. The ACES uses a concrete water/ice storage tank for thermal storage and glazed solar collectors to provide supplemental heating to the water/ice tank. The use of these concrete tanks and glazed solar collectors result in an initial cost that is too high to be recovered by fuel savings over a reasonable payback period. The improvements of this invention provide for low cost water/ice storage tanks and an adjustable geothermal heat pipe that provides supplemental heating to the water/ice storage tank replacing the solar collectors. The heat is provided by the deep earth and the water table.

10 Claims, 2 Drawing Figures

MODIFIED ANNUAL CYCLE ENERGY SYSTEM

BACKGROUND OF THE INVENTION

This invention relates generally to heating and air conditioning systems and more particularly to those wherein an ice-making heat pump is used to provide heating and ice generated in winter is used for summer cooling of buildings.

DESCRIPTION OF THE PRIOR ART

A heat pump is a well-known apparatus that can condition air for both heating and cooling. When heat pumps first came into use, they were installed in habitable structures in the Southeastern states. Then, a significant number of heat pumps were installed in Northern states, and problems began to surface.

Early heat pumps used unitary cooling-equipment hardware. Reversing valves and appropriate control hardware were added to the units to provide for a heating mode and a cooling mode. When operating in the heating mode at mild winter temperatures, the stresses on the equipment are about the same as found when operating in the cooling mode. However, as outdoor winter temperatures drop, the stresses increase and affect heat pump durability and reliability.

The ever-increasing energy conservation awareness and rapidly rising energy cost demand efficient energy usage. A heat pump is attractive because it is efficient. Engineers rate heating systems by their COP (coefficient of performance): heat produced divided by heat put in. One kilowatt hour is the equivalent of 3414.43 Btu; therefore, the COP of resistance electric heating is 1.

A heat pump can have a COP much higher than 1. For example, when the outside air is around 50° F. an air source heat pump will produce about 3 Btu of heat for each Btu of electrical energy put in.

Heat pumps have been developed that use ground water pumped to a heat exchanger for a heat source/sink. These have worked well in some areas, but they require a source water well, a water pump and in some cases a discharge well is required.

Solar assisted heat pumps have been developed that are very efficient. The main limitation with these is that the solar collectors required with these heat pumps are very expensive.

The ACES has proven to be the most economical system as far as operating cost is concerned. This is mainly due to the fact that ice generated during the heating season is used for summer cooling. During the summer the compressor is not used for space cooling. A brine solution is circulated through pipes in the water/ice storage tank to cool the building. The circulating pump requires only about 1/6 the energy that a compressor would require. A limitation with the ACES is that initial costs of the storage tank and solar collectors required in northern states is prohibitive.

An economical large water/ice storage tank could be constructed by using a plastic sheeting liner for the bottom and sides of the tank. U.S. Pat. No. 4,240,268 shows an insulated plastic lined tank design. The tank is illustrated in FIGS. 1 & 3 of this patent. The tank top is composed of a thin cover 32, of unspecified material, a layer of insulation 30, and a plastic sheeting 33. This tank top would not be able to support the weight of the earth covering the tank. The tank top is supported by the tank sides that are made of insulation and a plastic sheeting. It is doubtful that the tank sides could support the tank top and the earth above it. This patent does not deal with solving the problem of making a workable tank top for a plastic lined tank.

The foregoing illustrates limitations of the known prior art. Thus, it is apparent that it would be advantageous to provide an alternative directed to overcoming one or more of the limitations as set forth above. Accordingly, a suitable alternative is provided including features more fully disclosed hereinafter.

SUMMARY OF THE INVENTION

In one aspect of the present invention, this is accomplished by providing an apparatus for thermal storage of ice and water including a reservoir formed in the earth having an insulated, leak resistant liner. A heat pipe extends from within the reservoir into adjacent earth. Means are provided for adjusting the boiling point of a fluid within the heat pipe, the means being operably connected to the heat pipe and including a pump and a storage tank. An inlet of the pump is connected between the heat pipe and the pump and includes a first check valve. An outlet of the pump is connected between the pump and the storage tank and includes a second check valve. A shutoff valve is operably connected between the inlet and the outlet.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

A heat pipe is a pipe closed at both ends and having about 20% of its volume filled with a working fluid or refrigerant. The type of refrigerant and the internal pressure of the heat pipe are selected to allow the fluid to boil at a designed temperature. This is the operating temperature of the heat pipe. When the lower end of the heat pipe is heated to its operating temperature, the liquid within the pipe boils. The vaporized liquid rises under pressure to the top of the heat pipe. At the upper, cooler, end of the heat pipe the vapor is condensed by the cooler surface of the heat pipe. This gives off the heat of evaporation to the surface of the heat pipe at the cooler end. The condensed vapor then is returned by gravity to the lower end of the heat pipe where it is boiled again. The lower end of the heat pipe must be warmer than the boiling point of the heat pipe. The upper end of the heat pipe must be cooler than the boiling point of the heat pipe. The upper end of the heat pipe must be cooler than the boiling point of the heat pipe. A large amount of heat can be transferred between the two ends of the heat pipe with only a slight temperature difference between the two ends of the heat pipe.

Heat pipes are usually fairly short and are usually manufactured in factories. This invention proposes a heat pipe that could be several hundred feet long and that would be constructed at the building site from commonly available materials. This invention also provides a means of adjusting the boiling point of the heat pipe and thus allowing it to operate over a wide range of temperatures.

Figure 1:
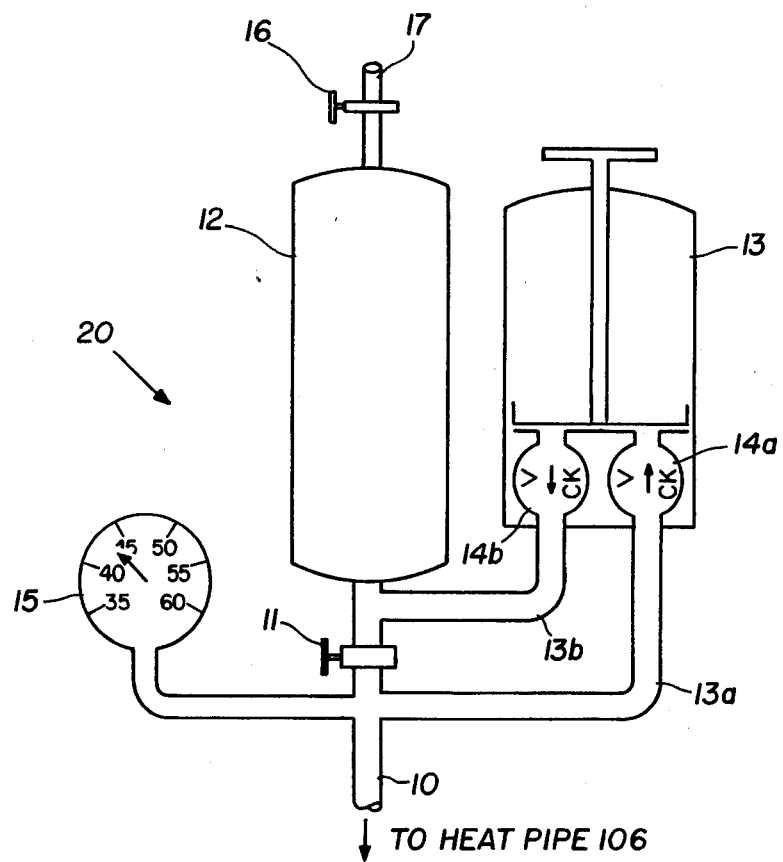
FIG. 1 is a diagrammatic view illustrating an embodiment of the apparatus used to adjust the pressure/boiling point of an adjustable geothermal heat pipe.

The adjustable heat pipe apparatus 20 of FIG. 1 is operably connected to a geothermal heat pipe 106 (FIG. 2) to be covered later. The purpose of the apparatus 20 of FIG. 1 is to allow the operating point, boiling point, of the heat pipe 106 to be adjusted between about 35° F. and 60° F. A connecting pipe 10 is connected to the heat pipe 106. Shutoff valve 11 isolates the pressure storage tank 12 from the heat pipe 106. Pump 13 is used to pump vapor from pipe 10 through inlet check valve 14a, pump 13, outlet check valve 14b and into pressure tank 12. Pump 13 includes an inlet 13a and an outlet 13b. An exemplary pressure of the pipe 10 is indicated on pressure gage 15. Valve 16 and connection 17 are provided to gain access to pressure tank 12 for maintenance and initial refrigerant charging of the heat pipe. In effect, pipe 10 is an extension of heat pipe 106.

When shutoff valve 11 is closed and pump 13 is operated, the pressure in pressure tank 12 is increased. The pressure within the connected pipe 10 is reduced. As a result the pressure in heat pipe 106 is also reduced. By reducing the pressure within the heat pipe 106, the boiling point of the liquid within the heat pipe 106 is also reduced. In this manner the operating or boiling point, of pipe 10 can be changed. Pressure gage 15 can be calibrated to indicate the boiling temperature of pipe 10. Shutoff valve 11 can be opened to raise the operating temperature of pipe 10.

Figure 2:
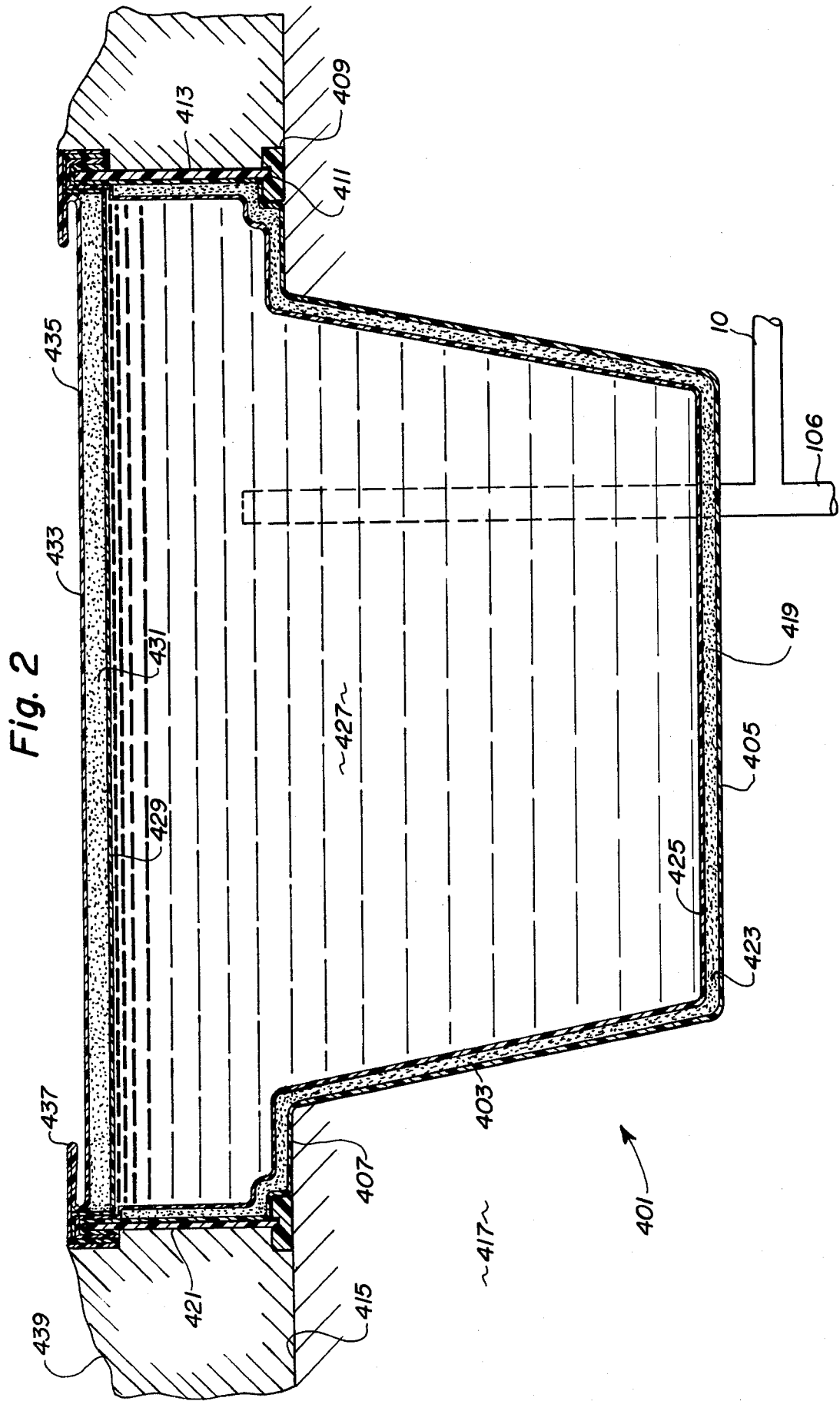
FIG. 2 is a diagrammatic view of an embodiment of freestanding Earth Tank operably connected to the adjusting apparatus of FIG. 1 and illustrating the detailed elements of the Earth Tank with a floating insulated tank top.

The geothermal adjustable heat pipe 106 in FIG. 2 is shown extending from a reservoir 401 downward to the deep earth and water table. The apparatus of FIG. 1 is operably connected to the upper end of the heat pipe 106 via connecting pipe 10. The geothermal heat pipe is made of ⅜ inch copper tubing and is installed in a 1½ inch boring. This boring may be made with inexpensive, portable, water-injection well drilling equipment available from the Deep Rock Manufacturing Co. that is capable of drilling to a depth of 200 feet. The geothermal heat pipe is installed at a depth of up to 200 feet from the bottom of reservoir 401. It is desirable to have a maximum amount of the geothermal heat pipe exposed to the water in the water table.

In order to relate these innovations to the previously mentioned ACES some of the ACES components must be understood. The ACES uses a matrix of plastic pipe within the water/ice tank. A brine solution is circulated through the matrix of plastic pipes within the tank. The heat pump uses the brine as a heat source in winter and the chilled brine forms ice around the individual pipes in the matrix. When 80% of the tank volume is ice, the tank is considered saturated. Additional ice forming could lead to damage to the tank structure. All ice in the tank is formed around the matrix of plastic pipes. The ACES can have a heating COP of about 3 while forming ice with a tank temperature of 32° F. The system can provide a heating COP of about 5 when the tank temperature is about 50° F. The first consideration is to provide enough ice to meet the summer cooling load. A secondary consideration is that of providing heating at the highest COP possible. These two objectives can be met by knowing the approximate heating and cooling loads of the building. In warmer climates, very little supplemental heat is required and the cooling load is nearly equal to the heating load. In colder climates the heating load may be several times the cooling load. The adjustable geothermal heat pipe of this invention would be operated to keep its operating temperature above the tank temperature and below the temperature of the water table during the early part of the heating season. This will allow the tank temperature to be kept fairly high providing a high COP.

Water in the water table is constantly migrating towards rivers and oceans. This will provide new water and new supplies of heat as heat is extracted from the water table by the heat pipe. Also, the heat flow in the water table is substantial because saturated earth is a good conductor of heat. The exact amount of heat available from the water table depends upon the depth and thickness of the water table and the rate of migration. It is clear that a large amount of heat may be collected from the water table.

When it was desired to start forming ice for the cooling season, the heat pipe would be adjusted to raise its operating temperature to maximum. This temperature would be about 60° F. and would be warmer than the water table. This effectively shuts off the heat pipe and allows ice to build up within an earth tank such as reservoir 401 for use in summer space cooling.

FIG. 2 illustrates reservoir 401 constructed independently of a building or dwelling such as those mentioned above. A hole is excavated with a circular perimeter. A sidewall 403 slopes so that a bottom portion 405 is somewhat smaller than upper portion 407. A baseplate 409, preferably of a synthetic material such as a suitable plastic, is about four inches wide with a one-quarter inch groove 411 to accept a wall portion 413 formed of a similar synthetic material. Baseplate 409 and wall 413 form a circular perimeter having a radius of about three feet larger than the excavated circular hole. Preferably, baseplate 409 is on an original grade 415 of surrounding earth 417. Wall 413 is preferably formed of sections, each interconnected by suitable fasteners. Wall 413 is about five feet in height. A first liner 419 of leak-resistant, commercially available material, as aforesaid, covers side 403 and bottom 405 and extends over wall 413. Liner 419 is preferably sealed or adhered to an outside surface 421 of wall 413. An R-40 insulating layer 423 of commercially available foam-type spray-applied insulation is applied to liner 419. A second liner 425, similar to first liner 419 covers foam layer 423 and extends over wall 413 to be sealed or adhered to outside surface 421.

Reservoir 401 should be filled with water 427 and a third liner 429, similar to liners 419, 425 is floated on the water. A similar R-50 foam layer 431 is applied and a fourth liner 433 is used to cover foam layer 431. Third and fourth liners 429, 433 are sealed to an outside wall surface 421 of wall 413. Preferably, exposed surface 435 of liner 433 is reflective so as to reflect sunlight. Fourth liner 433 preferably includes a fold 437 to permit sheets 429, 433 and layer 431 to raise and lower to compensate for expansion due to the presence or absence of ice in reservoir 401 to be used for summer cooling.

Reservoir 401 is preferably from about ten to twenty feet in overall depth and has a radius of from about twenty-five feet to several hundred feet depending on usage requirements. Preferably, heat pipes such as that illustrated at 106, FIGS. 2, can be added and connected to the apparatus 20 of FIG. 1 and used as heat exchangers with the water table as aforementioned. A fence is preferably used to limit people from having access to reservoir 401. A berm 439 of earth is preferably back filled to support wall 413.

The foregoing has described an adjustable geothermal heat pipe for supplying supplemental heating to a large water/ice thermal storage tank.

It is anticipated that aspects of the present invention, other than those specifically defined in the appended claims, can be obtained from the foregoing description and the drawings.

Having thus described the invention, what is claimed is:

1. An apparatus for the thermal storage of ice and water comprising:
    a reservoir formed in the earth, said reservoir having an insulated, leak resistant liner; a heat pipe having fluid therein and extending from within said reservoir into adjacent earth; and
    means for adjusting the boiling point of the fluid within said heat pipe, said means being operably connected to said heat pipe and including a pump, and a storage tank, said pump having an inlet connected to said heat pipe, said inlet connected to a first check valve, said pump having an outlet connected to said storage tank, said outlet connected to a second check valve, said inlet and said outlet having a shutoff valve operably connected therebetween.

2. The apparatus of claim 1 including a pressure gage connected to said heat pipe.

3. The apparatus of claim 1 including a sidewall formed partially of earth and partially of a synthetic material.

4. The apparatus of claim 3 wherein a portion of said sidewall formed of a synthetic material includes a baseplate having a groove formed therein and said synthetic sidewall portion is formed of sections inserted into said groove.

5. The apparatus of claim 4 wherein said synthetic sidewall portion is supported by a berm of earth formed thereabout.

6. The apparatus of claim 3 wherein said leak resistant liner includes first and second liner layers having a foam layer therebetween covering said sidewall.

7. The apparatus of claim 6 wherein said reservoir is filled with water and third and fourth liner layers are floated on said water, said third and fourth liner layers having a foam layer therebetween.

8. The apparatus of claim 7 including:
    means in said fourth liner layer to compensate for expansion due to the presence of ice in said reservoir, said means including a fold formed in said fourth liner layer.

9. The apparatus of claim 8 wherein a portion of said sidewall formed of a synthetic material includes a baseplate having a groove formed therein and said synthetic sidewall portion is formed of sections inserted into said groove.

10. The apparatus of claim 9 wherein said synthetic sidewall portion is supported by a berm of earth formed thereabout.

* * * * *